United States Patent
O'Brien et al.

(10) Patent No.: US 10,750,676 B2
(45) Date of Patent: Aug. 25, 2020

(54) GREENHOUSE DESICCANT DEHUMIDIFIER AND CARBON DIOXIDE GENERATOR

(71) Applicant: Therma-Stor LLC, Madison, WI (US)

(72) Inventors: Timothy S. O'Brien, DeForest, WI (US); Richard G. Giallombardo, Cottage Grove, WI (US); Clifton Tomasini, Madison, WI (US)

(73) Assignee: Therma-Stor, LLC, Madison, WI (US)

( * ) Notice: Subject to any disclaimer, the term of this patent is extended or adjusted under 35 U.S.C. 154(b) by 289 days.

(21) Appl. No.: 15/992,420

(22) Filed: May 30, 2018

(65) Prior Publication Data

US 2019/0364746 A1 Dec. 5, 2019

(51) Int. Cl.
| | |
|---|---|
| *B01D 53/02* | (2006.01) |
| *A01G 9/18* | (2006.01) |
| *B01D 53/26* | (2006.01) |
| *A01G 7/02* | (2006.01) |
| *A01G 9/24* | (2006.01) |

(52) U.S. Cl.
CPC .............. *A01G 9/18* (2013.01); *A01G 7/02* (2013.01); *A01G 9/246* (2013.01); *B01D 53/26* (2013.01)

(58) Field of Classification Search
CPC . A01G 7/02; A01G 9/18; A01G 9/246; B01D 2253/104; B01D 2253/106; B01D 2253/108; B01D 2258/00; B01D 2258/06; B01D 2259/4009; B01D 53/06; B01D 53/26; B01D 53/261; B01D 53/265; C01B 32/50
See application file for complete search history.

(56) References Cited

U.S. PATENT DOCUMENTS

| | | | |
|---|---|---|---|
| 4,995,242 A | 2/1991 | Assaf | |
| 6,652,628 B1 | 11/2003 | Hess | |
| 2008/0216341 A1* | 9/2008 | Mukaiyama | .......... F26B 23/005 34/124 |
| 2009/0277363 A1* | 11/2009 | Shibata | .................... F23J 15/02 110/186 |

(Continued)

OTHER PUBLICATIONS

Energy Wall™ Technology, *High Efficiency Energy Recovery*, downloaded from http://www.energywall.com/technology.php, dated Apr. 4, 2018.

(Continued)

*Primary Examiner* — Christopher P Jones
(74) *Attorney, Agent, or Firm* — Baker Botts L.L.P.

(57) ABSTRACT

A dehumidification system includes a desiccant, a primary heat exchanger, a secondary heat exchanger, three fans, and a burner. The first fan generates a carbon dioxide airflow through the primary heat exchanger and the secondary heat exchanger. The burner generates a flame into one end of the primary heat exchanger. The flame increases an amount of carbon dioxide within the carbon dioxide airflow. The second fan generates a reactivation airflow that flows over a portion of the secondary heat exchanger, a portion of the primary heat exchanger, and then through a first portion of the desiccant in order to dry the desiccant. The third fan generates a process airflow that flows through a second portion of the desiccant in order to provide dehumidification to the process airflow.

20 Claims, 3 Drawing Sheets

(56) References Cited

U.S. PATENT DOCUMENTS

2012/0000365 A1* 1/2012 Okano ............... B01D 53/261
                                                    96/144
2018/0031340 A1* 2/2018 Wilson ................ F24H 8/006
2018/0094560 A1* 4/2018 Williams ............. B01D 53/06

OTHER PUBLICATIONS

Polymer Membrane, *Our Product/dPoint*, dpoint technologies; downloaded from https://www.dpoint.ca/our-product/, dated Apr. 4, 2018.
Canadian Patent Office, Canadian First Office Action, Application No. 3,040,998, 4 pages.

* cited by examiner

US 10,750,676 B2

GREENHOUSE DESICCANT DEHUMIDIFIER AND CARBON DIOXIDE GENERATOR

TECHNICAL FIELD

This invention relates generally to greenhouses and more particularly to a greenhouse desiccant dehumidifier and carbon dioxide generator.

BACKGROUND OF THE INVENTION

Greenhouses are utilized in many geographical locations to grow crops and plants year-round and in climates that may not otherwise provide hospitable growing conditions. Greenhouses typically consist of structures that enable environmental conditions inside the structure to be regulated and controlled. For example, it is usually desirable to have higher carbon dioxide (CO2) levels within a greenhouse to increase yield. Maintaining high carbon dioxide levels within a greenhouse, however, typically causes excessive amounts of heat and moisture within the greenhouse.

SUMMARY OF THE INVENTION

According to embodiments of the present disclosure, disadvantages and problems associated with previous greenhouse systems may be reduced or eliminated.

In some embodiments, a dehumidification system includes a desiccant, a primary heat exchanger, a secondary heat exchanger, three fans, and a burner. The first fan generates a carbon dioxide airflow through the primary heat exchanger and the secondary heat exchanger. The burner generates a flame into one end of the primary heat exchanger. The flame increases an amount of carbon dioxide within the carbon dioxide airflow. The second fan generates a reactivation airflow that flows over a portion of the secondary heat exchanger, a portion of the primary heat exchanger, and then through a first portion of the desiccant in order to dry the desiccant. The third fan generates a process airflow that flows through a second portion of the desiccant in order to provide dehumidification to the process airflow.

Certain embodiments of the present disclosure may provide one or more technical advantages. Some embodiments provide a greenhouse desiccant dehumidifier and carbon dioxide generator that may be used by greenhouses to increase the amount of carbon dioxide within the greenhouse while simultaneously providing dehumidification and cooling to the greenhouse. To accomplish this, embodiments of the disclosure include one or more heat exchangers, a fuel burner, and a desiccant. A first heated airflow from the fuel burner is directed through the one or more heat exchangers to transfer heat to a second airflow flowing over the one or more heat exchangers. This cools the first airflow and condenses water vapor within the first airflow into liquid water, but does not affect the carbon dioxide content of the first airflow. The cooled, less moist first airflow with its increased carbon dioxide content may then be introduced into a greenhouse. This allows the greenhouse to have increased carbon dioxide levels while maintaining desired humidity and temperature levels within the greenhouse. The second airflow, after being heated by the one or more heat exchangers, is then passed through a portion of the desiccant to regenerate the desiccant. After passing through the desiccant, the second airflow may be directed outdoors. A third airflow is taken from the interior of the greenhouse, passed through another portion of the desiccant, and then returned to the greenhouse. The desiccant absorbs water vapor from the third airflow, thereby further dehumidifying the greenhouse.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Greenhouses are utilized in many geographical locations to grow crops and plants year-round and in climates that may not otherwise provide hospitable growing conditions. Greenhouses typically consist of structures that enable environmental conditions inside the structure to be regulated and controlled. For example, it is usually desirable to have higher carbon dioxide (CO2) levels within a greenhouse to increase yield. Maintaining high carbon dioxide levels within a greenhouse, however, typically causes excessive amounts of heat and moisture within the greenhouse. For example, some greenhouses utilize fuel burners to generate and introduce additional carbon dioxide into the greenhouse. The carbon dioxide is consumed by plants within the greenhouse and helps to increase yield. In addition to carbon dioxide, fuel burners introduce additional heat and water vapor, which may be undesirable in greenhouses. The additional heat may cause the greenhouse to overheat and the additional water vapor may increase the humidity within the greenhouse to levels that cause damage to the plants and/or the greenhouse itself.

To address these and other problems and inefficiencies of existing greenhouse systems, the disclosed embodiments provide a greenhouse desiccant dehumidifier and carbon dioxide generator that may be used by greenhouses to increase the amount of carbon dioxide within the greenhouse while simultaneously providing dehumidification and cooling to the greenhouse. To accomplish this, embodiments of the disclosure include one or more heat exchangers, a fuel burner, and a desiccant. A first heated airflow from the fuel burner is directed through the one or more heat exchangers to transfer heat to a second airflow flowing over the one or more heat exchangers. This cools the first airflow and condenses water vapor within the first airflow into liquid water, but does not affect the carbon dioxide content of the first airflow. The cooled, less moist first airflow with its increased carbon dioxide content may then be introduced into a greenhouse. This allows the greenhouse to have increased carbon dioxide levels while maintaining desired humidity and temperature levels within the greenhouse. The second airflow, after being heated by the one or more heat exchangers, is then passed through a portion of the desiccant to regenerate the desiccant. After passing through the desiccant, the second airflow may be directed outdoors. A third airflow is taken from the interior of the greenhouse, passed through another portion of the desiccant, and then returned to the greenhouse. The desiccant absorbs water vapor from the third airflow, thereby further dehumidifying the greenhouse.

Figure 1:
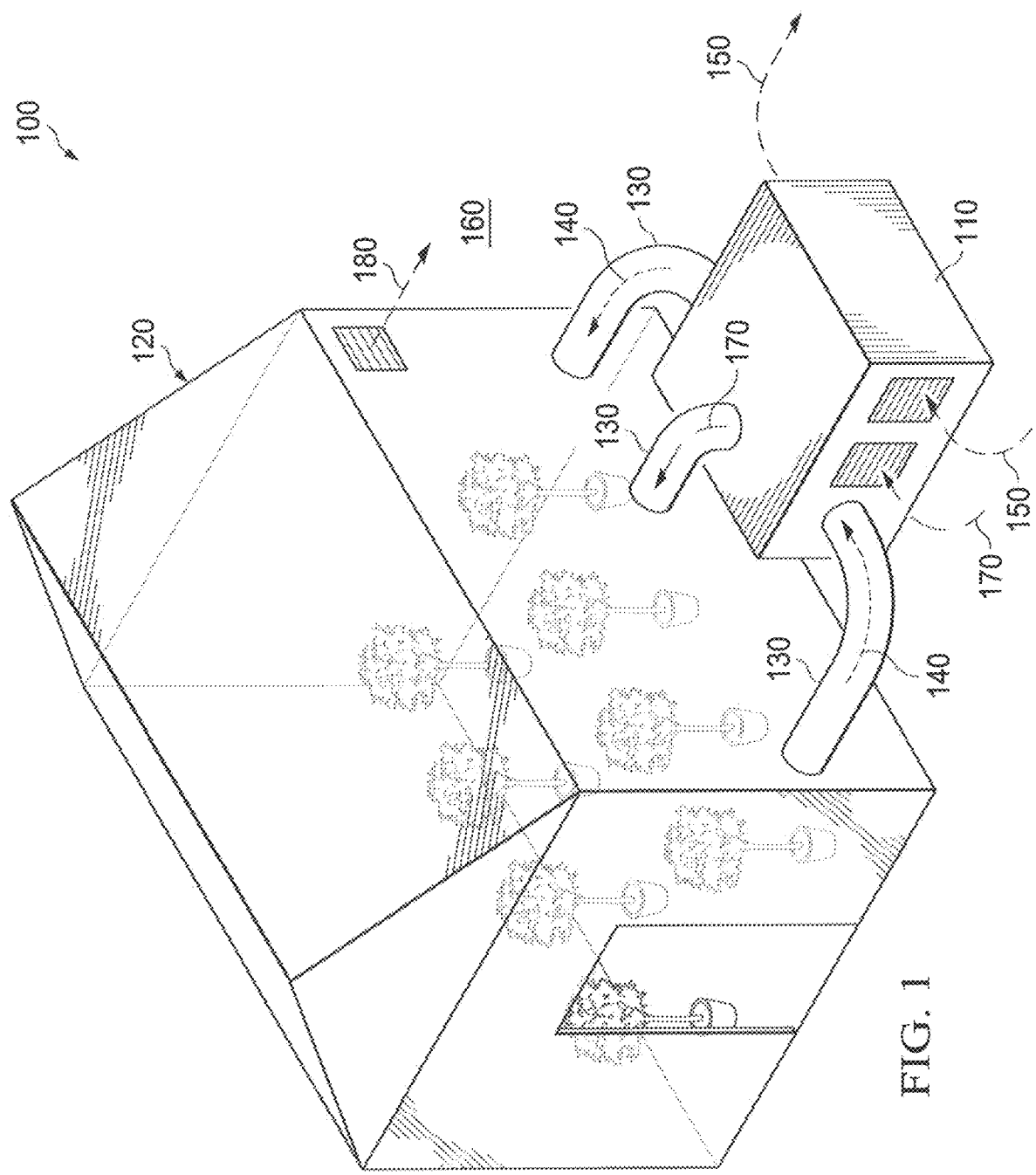
FIG. 1 illustrates a greenhouse system, according to certain embodiments.
Figure 2:
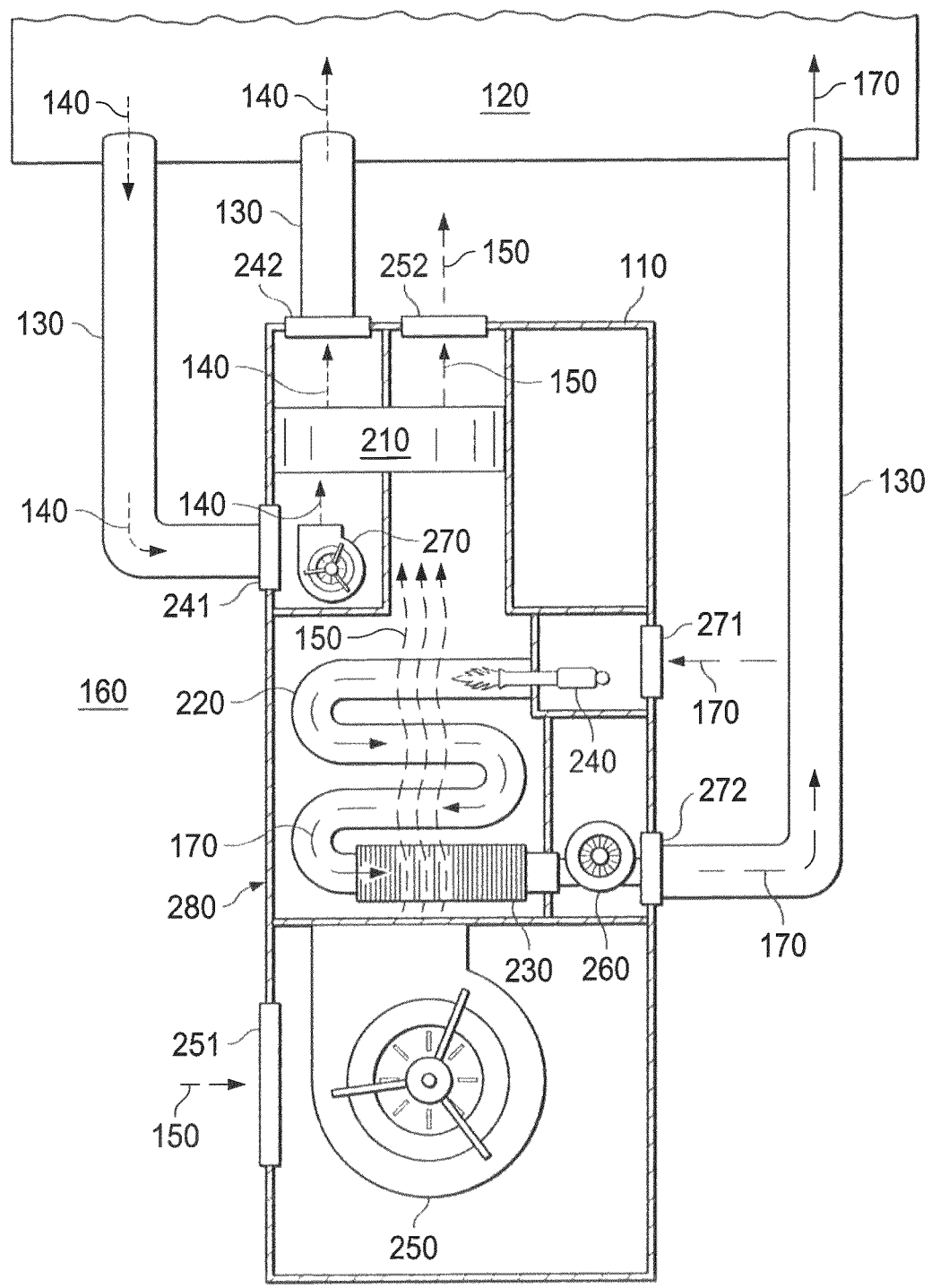
FIG. 2 illustrates a desiccant dehumidifier and carbon dioxide generator that may be utilized by the greenhouse system of FIG. 1, according to certain embodiments.
Figure 3:
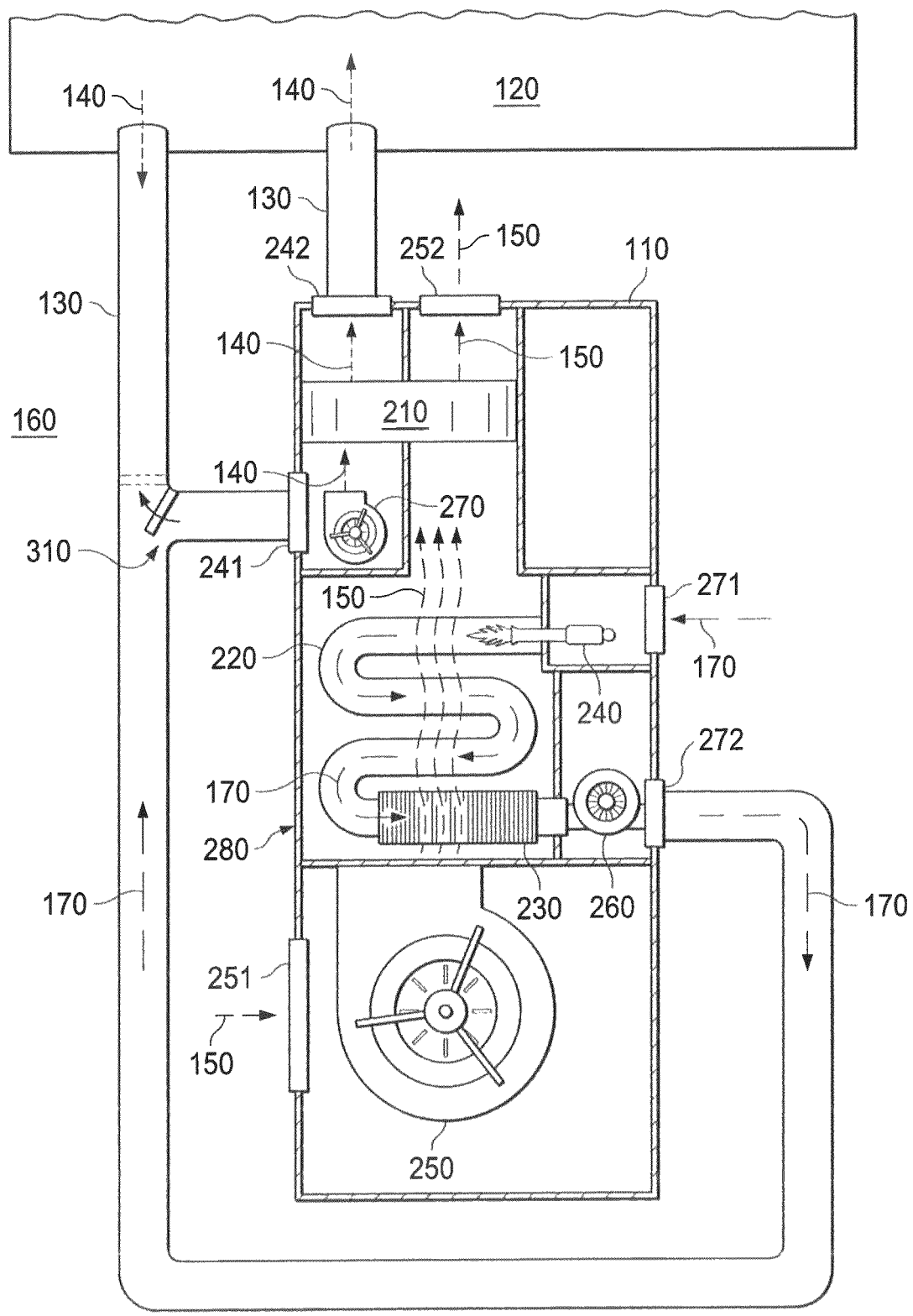
FIG. 3 illustrates another configuration of a desiccant dehumidifier and carbon dioxide generator that may be utilized by the greenhouse system of FIG. 1, according to certain embodiments.

The advantages and features of certain embodiments are discussed in more detail below in reference to FIGS. 1-3. FIG. 1 illustrates a greenhouse system, FIG. 2 illustrates a desiccant dehumidifier and carbon dioxide generator that may be utilized by the greenhouse system of FIG. 1, and FIG. 3 illustrates another configuration of a desiccant dehumidifier and carbon dioxide generator that may be utilized by the greenhouse system of FIG. 1, according to certain embodiments.

FIG. 1 illustrates a greenhouse system 100, according to certain embodiments. As illustrated in FIG. 1, greenhouse system 100 may include a greenhouse 120 and a desiccant dehumidifier and carbon dioxide generator 110. In some embodiments, desiccant dehumidifier and carbon dioxide generator 110 may be located in an outdoor environment 160 (i.e., outside of greenhouse 120). In other embodiments, desiccant dehumidifier and carbon dioxide generator 110 may be installed within greenhouse 120 (e.g., within a wall of greenhouse 120). In some embodiments, desiccant dehumidifier and carbon dioxide generator 110 may be physically connected to greenhouse 120 via one or more ducts 130. Ducts 130 may be used to circulate a process airflow 140 through desiccant dehumidifier and carbon dioxide generator 110 and back into greenhouse 120. In addition, a duct 130 may be used to transport a carbon dioxide airflow 170 from desiccant dehumidifier and carbon dioxide generator 110 into greenhouse 120. In embodiments where desiccant dehumidifier and carbon dioxide generator 110 is installed within greenhouse 120, process airflow 140 and reactivation airflow 150 may flow directly between desiccant dehumidifier and carbon dioxide generator 110 and greenhouse 120 without any ducts 130.

In general, desiccant dehumidifier and carbon dioxide generator 110 provides beneficial carbon dioxide to greenhouse 120 while simultaneously providing dehumidification and cooling to greenhouse 120. To accomplish this, desiccant dehumidifier and carbon dioxide generator 110 includes three airflows: process airflow 140, reactivation airflow 150, and carbon dioxide airflow 170. A first airflow, carbon dioxide airflow 170, flows from outdoor environment 160 and into a fuel burner where it is heated and its carbon dioxide content is increased. Carbon dioxide airflow 170 then flows through one or more heat exchangers in order to transfer heat to a second airflow, reactivation airflow 150, that is flowing over the one or more heat exchangers. This cools carbon dioxide airflow 170 and condenses water vapor within carbon dioxide airflow 170 into liquid water but does not affect the carbon dioxide content of carbon dioxide airflow 170. The cooled, drier carbon dioxide airflow 170 with its increased carbon dioxide content may then be introduced into greenhouse 120. This allows greenhouse 120 to have increased carbon dioxide levels while maintaining desired humidity and temperature levels within the greenhouse. Reactivation airflow 150, after being heated by the one or more heat exchangers, is then passed through a portion of a desiccant within desiccant dehumidifier and carbon dioxide generator 110 in order to dry and regenerate the desiccant. After passing through the desiccant, reactivation airflow 150 may then be directed back into outdoor environment 160. A third airflow, process airflow 140, is taken from the interior of greenhouse 120, passed through another portion of the desiccant, and then returned to greenhouse 120. The desiccant absorbs water vapor from process airflow 140, thereby further dehumidifying greenhouse 120. As a result, the operation and maintenance of greenhouse 120 may be more cost and energy efficient while the yield of greenhouse 120 may be increased.

The heating portion of desiccant dehumidifier and carbon dioxide generator 110 generally has a different goal than a typical condensing furnace or boiler. Desiccant dehumidifier and carbon dioxide generator 110 converts a flow of atmospheric air (e.g., carbon dioxide airflow 170) into a flow with higher concentration of carbon dioxide using a combustion burner (e.g., burner 240). A goal of desiccant dehumidifier and carbon dioxide generator 110 is to cool this airflow in order to condense and remove as much water vapor from it as possible as well as reducing the amount of combustion heat added to the greenhouse. In addition, desiccant dehumidifier and carbon dioxide generator 110 may be configured to provide a very hot airflow (e.g., reactivation airflow 150) to a desiccant media (e.g., desiccant 210) in order to regenerate the desiccant.

Greenhouse 120 is any enclosure that is used to grow plants. In general, greenhouse 120 is used to maintain certain environmental conditions to support plant growth. For example, the temperature, humidity, and levels of carbon dioxide within greenhouse 120 may be maintained to certain levels to provide essential conditions to support plant growth. In some embodiments, greenhouse 120 may be ventilated to outside environment 160. For example, some greenhouses 120 may utilize an exhaust fan to ventilate excess heat and moisture from the greenhouse to outside environment 160 via greenhouse ventilation airflow 180.

While some embodiments have been described as being utilized by greenhouse 120, the disclosed embodiments may be utilized by any other enclosed space. The disclosed embodiments are not limited to being used only with greenhouses such as greenhouse 120. Any space that needs increased carbon dioxide levels along with lower humidity and cooler temperatures may benefit from desiccant dehumidifier and carbon dioxide generator 110.

FIG. 2 illustrates a desiccant dehumidifier and carbon dioxide generator 110 that may be utilized with greenhouse system 100, according to certain embodiments. In some embodiments, desiccant dehumidifier and carbon dioxide generator 110 includes a desiccant 210, a primary heat exchanger 220, a secondary heat exchanger 230, a burner 240, and three fans: reactivation fan 250, combustion fan 260, and process airflow fan 270. In some embodiments, desiccant dehumidifier and carbon dioxide generator 110 may be packaged within an enclosure 280, which may be any appropriate shape or size. In some embodiments, enclosure 280 includes a process airflow inlet 241, a process airflow outlet 242, a reactivation airflow inlet 251, a reactivation airflow outlet 252, a carbon dioxide airflow inlet 271, and a carbon dioxide airflow outlet 272. Inlets 241, 251, and 271 and outlets 242, 252, and 272 may be any appropriate shape and size and may be in any appropriate location on enclosure 280. In some embodiments, inlets 241, 251, and 271 and outlets 242, 252, and 272 are suitably shaped and sized to accommodate ducts 130. In some embodiments, reactivation airflow inlet 251 and carbon dioxide airflow inlet 271 may be combined into a single inlet of desiccant dehumidifier and carbon dioxide generator 110 since they are both inlets for airflows from outdoor environment 160.

In general, desiccant 210 is made of any appropriate solid or liquid material (e.g., activated alumina, silica gel, molecular sieve, etc.) that is capable of absorbing water vapor from process airflow 140, thereby providing dehumidification to process airflow 140. In some embodiments, desiccant 210 is wheel-shaped and rotates in either a clockwise or counter-clockwise motion when viewed from above. In embodiments that rotate, an electric motor (not illustrated) may be provided within desiccant dehumidifier and carbon dioxide generator 110 to cause desiccant 210 to rotate. This shape allows one portion of desiccant 210 (e.g., one side of the desiccant wheel) to be within process airflow 140 and another portion (e.g., the opposite side of the desiccant wheel) to be within reactivation airflow 150 at the same time. In some embodiments, for example, half of desiccant 210 may be within process airflow 140 while the other half is within reactivation airflow 150. The rotation of desiccant 210 permits desiccant 210 to provide continuous dehumidification to process airflow 140 since portions that absorb moisture are then rotated to reactivation airflow 150 where they are dried and then returned to process airflow 140.

Primary heat exchanger 220 and secondary heat exchanger 230 are each devices that transfer heat between carbon dioxide airflow 170 and reactivation airflow 150. Primary heat exchanger 220 and secondary heat exchanger 230 may be any type of heat exchanger such as a shell and tube heat exchanger, a plate heat exchanger, a plate and shell heat exchanger, a plate fin heat exchanger, a direct contact heat exchanger, a microchannel heat exchanger, and the like. In some embodiments, one end of primary heat exchanger 220 is coupled to burner 240 and the other end of primary heat exchanger 220 is coupled to secondary heat exchanger 230 as illustrated in FIG. 2. In these embodiments, burner 240 introduces a flame into one end of primary heat exchanger 220, which heats carbon dioxide airflow 170 as it travels into primary heat exchanger 220. Carbon dioxide airflow 170 flows through primary heat exchanger 220, into secondary heat exchanger 230, and then ultimately out of desiccant dehumidifier and carbon dioxide generator 110 via carbon dioxide airflow outlet 272. In other embodiments, however, only a single heat exchanger may be utilized by desiccant dehumidifier and carbon dioxide generator 110. In these embodiments, burner 240 introduces a flame into one end of the single heat exchanger (e.g., primary heat exchanger 220), which heats carbon dioxide airflow 170 as it travels into the single heat exchanger. Carbon dioxide airflow 170 flows through the single heat exchanger and then ultimately out of desiccant dehumidifier and carbon dioxide generator 110 via carbon dioxide airflow outlet 272.

Burner 240 is any appropriate device that introduces a flame into carbon dioxide airflow 170. In some embodiments, burner 240 is a fuel burner that burns propane, natural gas, diesel, kerosene, or any other appropriate fuel. In some embodiments, burner 240 is an indirect-fired burner. In general, burner 240 heats carbon dioxide airflow 170 as it enters primary heat exchanger 220 and increases the carbon dioxide content of carbon dioxide airflow 170.

Fans 250, 260, and 270 may be any type of air mover (e.g., axial fan, forward inclined impeller, backward inclined impeller, etc.) that is configured to generate reactivation airflow 150, carbon dioxide airflow 170, and process airflow 140, respectively. In some embodiments, fans 250, 260, and 270 are variable-speed fans.

Fans 250, 260, and 270 may be located in any appropriate location within desiccant dehumidifier and carbon dioxide generator 110. In some embodiments, fans 250, 260 and 270 may be located proximate to inlets 251, 271, and 241, respectively, either inside or outside of desiccant dehumidifier and carbon dioxide generator 110. In other embodiments, fans 250, 260, and 270 may be located proximate to outlets 252, 272, and 242, respectively, either inside or outside of desiccant dehumidifier and carbon dioxide generator 110. In some embodiments, fans 250, 260, and 270 may not be included within or coupled to desiccant dehumidifier and carbon dioxide generator 110 at all. For example, process airflow fan 270 may be external to desiccant dehumidifier and carbon dioxide generator 110 (e.g., within a duct 130 or greenhouse 120). Furthermore, fans 250, 260, and 270 may be configured to generate airflows 150, 170, and 140, respectively, in any appropriate direction through desiccant dehumidifier and carbon dioxide generator 110. For example, process airflow 140 and reactivation airflow 150 may be in a counterflow arrangement in some embodiments.

In operation, desiccant dehumidifier and carbon dioxide generator 110 provides beneficial carbon dioxide to greenhouse 120 while simultaneously providing dehumidification and cooling to greenhouse 120. In some embodiments, carbon dioxide airflow 170 is drawn from outdoor environment 160 (or from greenhouse 120 in some embodiments) into desiccant dehumidifier and carbon dioxide generator 110 by combustion fan 260 through carbon dioxide airflow inlet 271 where it first flows into burner 240. Burner 240 heats carbon dioxide airflow 170 and increases the carbon dioxide content of carbon dioxide airflow 170. Carbon dioxide airflow 170 then flows through primary heat exchanger 220 and secondary heat exchanger 230 (or alternatively a single heat exchanger) in order to transfer heat from carbon dioxide airflow 170 to reactivation airflow 150 that is flowing over primary heat exchanger 220 and secondary heat exchanger 230. This cools carbon dioxide airflow 170 and condenses water vapor within carbon dioxide airflow 170 into liquid water but does not affect the carbon dioxide content of carbon dioxide airflow 170. The condensed water from carbon dioxide airflow 170 may then be drained out of desiccant dehumidifier and carbon dioxide generator 110. The cooled, drier carbon dioxide airflow 170 with its increased carbon dioxide content may then exit desiccant dehumidifier and carbon dioxide generator 110 via carbon dioxide airflow outlet 272 and be directed into greenhouse 120 via, for example, duct 130. This allows greenhouse 120 to have increased carbon dioxide levels while maintaining desired humidity and temperature levels within the greenhouse.

Reactivation airflow 150, which is drawn into desiccant dehumidifier and carbon dioxide generator 110 via reactivation fan 250 through reactivation airflow inlet 251, flows over and is heated by secondary heat exchanger 230 and primary heat exchanger 220. After being heated by secondary heat exchanger 230 and primary heat exchanger 220, reactivation airflow 150 flows through a portion of desiccant 210 in order to regenerate desiccant 210. After passing through desiccant 210, reactivation airflow 150 may then be directed back into outdoor environment 160 via reactivation airflow outlet 252.

Process airflow 140 is drawn from the interior of greenhouse 120 and into desiccant dehumidifier and carbon dioxide generator 110 through process airflow inlet 241 via process airflow fan 270. Process airflow 140 passes through a different portion of desiccant 210 from reactivation airflow 150, exits desiccant dehumidifier and carbon dioxide generator 110 via process airflow outlet 242, and is directed back to greenhouse 120 via, for example, a duct 130.

Desiccant 210 absorbs water vapor from process airflow 140, thereby further dehumidifying greenhouse 120. As a result, the operation and maintenance of greenhouse 120 may be more cost and energy efficient while the yield of greenhouse 120 may be increased.

In some embodiments, fans 250, 260, and 270 may be automatically enabled/disabled based on conditions within greenhouse 120. For example, when the humidity within greenhouse 120 reaches or exceeds a predetermined amount (e.g., 90% humidity as detected by a humidistat within greenhouse 120 or desiccant dehumidifier and carbon dioxide generator 110), fans 250, 260, and 270 may be enabled to generate airflows 140, 150, and 170 in order to transfer moisture out of greenhouse 120 to outside environment 160. When the humidity within greenhouse 120 is below the predetermined amount, fans 250, 260, and 270 may be disabled to conserve energy. As another example, when the temperature within greenhouse 120 reaches or exceeds a predetermined amount (e.g., 100 degrees F. as detected by a thermostat within greenhouse 120 or desiccant dehumidifier and carbon dioxide generator 110), fans 250, 260, and 270 may be enabled to generate greenhouse airflows 140, 150, and 170 in order to transfer heat out of greenhouse 120 to outside environment 160. When the temperature within greenhouse 120 is below the predetermined amount, fans 250, 260, and 270 may be disabled to conserve energy. As another example, when the carbon dioxide level within greenhouse 120 reaches or falls below a predetermined amount as detected by a sensor within greenhouse 120 or desiccant dehumidifier and carbon dioxide generator 110, fans 250, 260, and 270 may be enabled to generate greenhouse airflows 140, 150, and 170 in order to increase the carbon dioxide level within greenhouse 120. When the carbon dioxide level within greenhouse 120 exceeds the predetermined amount, fans 250, 260, and 270 may be disabled to conserve energy.

In some embodiments, the balance of airflows and component sizes of desiccant dehumidifier and carbon dioxide generator 110 may be rearranged compared to a typical condensing furnace. For example, reactivation airflow 150 might be very high over secondary heat exchanger 230 (i.e., to cool and condense water vapor from carbon dioxide airflow 170), but then a certain portion of reactivation airflow 150 could be shunted out of the stream and out of desiccant dehumidifier and carbon dioxide generator 110 (e.g., into outside environment 160) before or during primary heat exchanger 220. This may provide a lower volume but much higher temperature airflow to regenerate desiccant 210. This may minimize the temperature and amount of water vapor remaining in the carbon dioxide airflow 170 while simultaneously providing maximum regeneration temperature of desiccant 210.

In some embodiments, carbon dioxide airflow inlet 271 may receive air directly from outside environment 160 or from greenhouse 120 via a duct 130. In embodiments where carbon dioxide airflow 170 enters desiccant dehumidifier and carbon dioxide generator 110 directly from outside environment 160, combustion fan 260 may be used with or without engaging burner 240 in order to ventilate greenhouse 120.

In cold climates, reactivation airflow 150 may be configured to operate as a condensing furnace. For example, reactivation airflow 150 may be directed out of desiccant dehumidifier and carbon dioxide generator 110 and into greenhouse 120 (e.g. via a duct 130) in order to provide heat to greenhouse 130. In such embodiments, desiccant 210 and process airflow fan 270 may be deactivated if dehumidification of greenhouse 120 is not required. In addition, carbon dioxide airflow outlet 272 may be connected to outside environment 160.

Typically, desiccant dehumidifier and carbon dioxide generator 110 adds heat to greenhouse 120 in many climates due to the heat from combustion in carbon dioxide airflow 170 and the carryover regeneration heat transferred from reactivation airflow 150 to process airflow 140 by desiccant 210. However, when outside environment 160 is significantly colder than the interior of greenhouse 120, normal operation of desiccant dehumidifier and carbon dioxide generator 110 may provide some cooling to greenhouse 120.

FIG. 3 illustrates another configuration of desiccant dehumidifier and carbon dioxide generator 110, according to certain embodiments. In this configuration, carbon dioxide airflow 170 replaces process airflow 140 or is combined with process airflow 140 such that carbon dioxide airflow 170 passes thru desiccant 210 once and is dried before it enters greenhouse 120. In some embodiments, carbon dioxide airflow 170 may be externally ducted from carbon dioxide airflow outlet 272 into process airflow inlet 241 (i.e., replacing process airflow 140 from greenhouse 120). Alternatively, the internal components of desiccant dehumidifier and carbon dioxide generator 110 may be rearranged such that carbon dioxide airflow 170 flows directly into desiccant 210 after passing over secondary heat exchanger 230. In embodiments where carbon dioxide airflow 170 completely replaces process airflow 140, process airflow fan 270 may be eliminated from desiccant dehumidifier and carbon dioxide generator 110. In some embodiments, a duct 130 carrying carbon dioxide airflow 170 may be coupled to a duct 130 carrying process airflow 140 as illustrated. In such an embodiment, a damper 310 may be included in order to control the amount of mixture of carbon dioxide airflow 170 with process airflow 140.

Although a particular implementation of desiccant dehumidifier and carbon dioxide generator 110 is illustrated and primarily described, the present disclosure contemplates any suitable implementation of desiccant dehumidifier and carbon dioxide generator 110 according to particular needs. Moreover, although various components of desiccant dehumidifier and carbon dioxide generator 110 have been depicted as being located at particular positions, the present disclosure contemplates those components being positioned at any suitable location, according to particular needs.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A dehumidification system, comprising:
    an enclosure comprising:
        a process airflow inlet and a process airflow outlet;
        a reactivation airflow inlet and a reactivation airflow outlet;
        a carbon dioxide airflow inlet and a carbon dioxide airflow outlet, wherein each of the process airflow inlet, the process airflow outlet, and the carbon dioxide airflow outlet is configured to be separately coupled to a greenhouse via one of a plurality of ducts;
    a desiccant;
    a primary heat exchanger;
    a secondary heat exchanger coupled to the primary heat exchanger;
    a first fan configured to generate a carbon dioxide airflow through the primary heat exchanger and the secondary heat exchanger, the carbon dioxide airflow entering the enclosure through the carbon dioxide airflow inlet and exiting the enclosure through the carbon dioxide airflow outlet;
    a burner configured to generate a flame into one end of the primary heat exchanger, the flame configured to increase an amount of carbon dioxide within the carbon dioxide airflow;
    a second fan configured to generate a reactivation airflow that flows over a portion of the secondary heat exchanger, a portion of the primary heat exchanger, and then through a first portion of the desiccant in order to dry the desiccant, the reactivation airflow entering the enclosure through the reactivation airflow inlet and exiting the enclosure through the reactivation airflow outlet;
    a third fan configured to generate a process airflow that flows through a second portion of the desiccant in order to provide dehumidification to the process airflow, the process airflow entering the enclosure through the process airflow inlet and exiting the enclosure through the process airflow outlet.

2. The dehumidification system of claim 1, wherein the desiccant is wheel-shaped.

3. The dehumidification system of claim 1, wherein the desiccant is a solid or a liquid.

4. The dehumidification system of claim 1, wherein the reactivation airflow inlet and the carbon dioxide airflow inlet are a common inlet that is configured to intake air from an outdoor environment.

5. The dehumidification system of claim 1, wherein the burner is an indirect-fired burner.

6. The dehumidification system of claim 1, wherein the burner is configured to burn a fuel selected from the group consisting of:
    propane;
    natural gas;
    diesel; and
    kerosene.

7. A dehumidification system, comprising:
    a desiccant;
    a primary heat exchanger;
    a secondary heat exchanger;
    a first fan configured to generate a carbon dioxide airflow through the primary heat exchanger and the secondary heat exchanger;
    a burner configured to generate a flame into one end of the primary heat exchanger, the flame configured to increase an amount of carbon dioxide within the carbon dioxide airflow;
    a second fan configured to generate a reactivation airflow that flows over a portion of the secondary heat exchanger, a portion of the primary heat exchanger, and then through a first portion of the desiccant in order to dry the desiccant; and
    a third fan configured to generate a process airflow that flows through a second portion of the desiccant in order to provide dehumidification to the process airflow.

8. The dehumidification system of claim 7, wherein the dehumidification system is configured to:
    exhaust the carbon dioxide airflow to a greenhouse after the carbon dioxide airflow exits the secondary heat exchanger;
    intake the reactivation airflow from an outdoor environment before it flows over the portion of the secondary heat exchanger;
    exhaust the reactivation airflow to the outdoor environment after if flows through the first portion of the desiccant;
    intake the process airflow from the greenhouse before it flows through the second portion of the desiccant; and
    exhaust the process airflow to the greenhouse after it flows through the second portion of the desiccant.

9. The dehumidification system of claim 7, wherein the desiccant is wheel-shaped.

10. The dehumidification system of claim 7, wherein the desiccant is a solid or a liquid.

11. The dehumidification system of claim 7, wherein the burner is an indirect-fired burner.

12. The dehumidification system of claim 7, wherein the burner is configured to burn a fuel selected from the group consisting of:
    propane;
    natural gas;
    diesel; and
    kerosene.

13. A system, comprising:
    a desiccant;
    a heat exchanger;
    a first fan configured to generate a first airflow through the heat exchanger;
    a burner configured to generate a flame into one end of the heat exchanger, the flame configured to increase an amount of carbon dioxide within the first airflow; and
    a second fan configured to generate a reactivation airflow that flows over a portion of the heat exchanger and then through a first portion of the desiccant in order to dry the desiccant;
    wherein the first fan is further configured to pass the first airflow through a second portion of the desiccant after the first airflow exits the heat exchanger in order to provide dehumidification to the first airflow.

14. The system of claim 13, wherein the system is configured to:
- exhaust the first airflow to a greenhouse after the first airflow exits the desiccant;
- intake the reactivation airflow from an outdoor environment before it flows over the portion of the heat exchanger; and
- exhaust the reactivation airflow to the outdoor environment after if flows through the first portion of the desiccant.

15. The system of claim 13, wherein the desiccant is wheel-shaped.

16. The system of claim 13, wherein the desiccant is configured to rotate.

17. The system of claim 13, wherein the desiccant is a solid or a liquid.

18. The system of claim 13, wherein the burner is an indirect-fired burner.

19. The system of claim 13, wherein the burner is configured to burn a fuel selected from the group consisting of:
- propane;
- natural gas;
- diesel; and
- kerosene.

20. The system of claim 13, wherein the heat exchanger comprises a primary heat exchanger and a secondary heat exchanger.

* * * * *